No. 672,238. Patented Apr. 16, 1901.
F. D. PHILP.
PISTON ROD PACKING.
(Application filed Oct. 16, 1900.)
(No Model.)
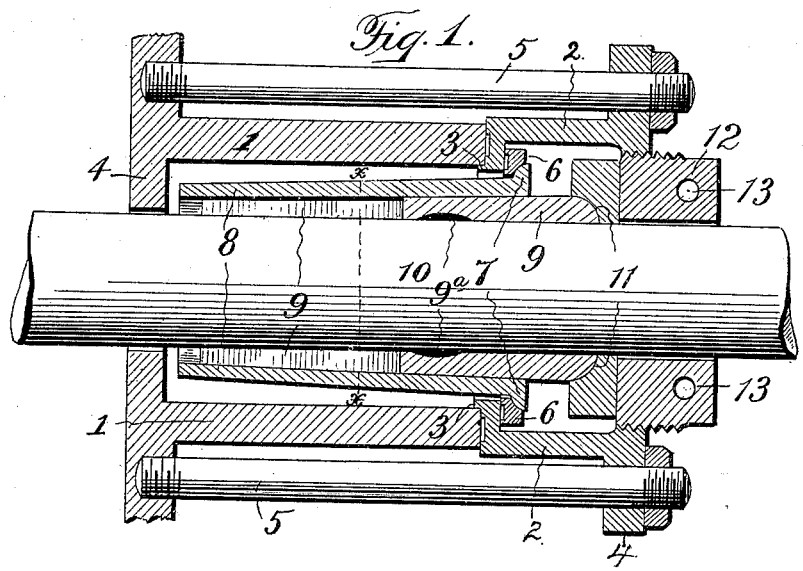
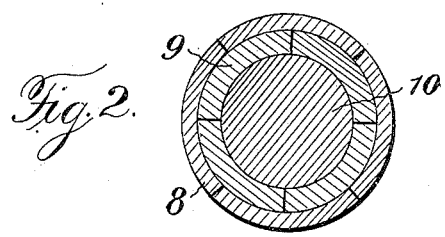
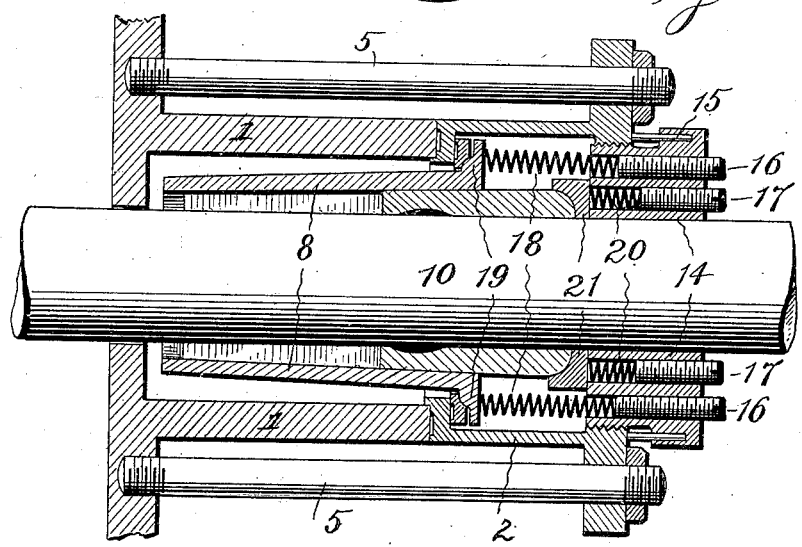
WITNESSES
Jas. E. Hutchinson.
G. F. Downing.
INVENTOR
F. D. Philp
By H. A. Seymour
Attorney

UNITED STATES PATENT OFFICE.

FREDERICK D. PHILP, OF BUFFALO, NEW YORK.

PISTON-ROD PACKING.

SPECIFICATION forming part of Letters Patent No. 672,238, dated April 16, 1901.

Application filed October 16, 1900. Serial No. 33,306. (No model.)

*To all whom it may concern:*

Be it known that I, FREDERICK D. PHILP, a resident of Buffalo, in the county of Erie and State of New York, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in piston-rod packing, the object of the invention being to provide a packing of this character which will permit of a slight vibrating movement of the piston-rod or permit it to work at an incline and at the same time maintain the packing steam-tight.

With this object in view the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a view in section on the line x x of Fig. 1, and Fig. 3 is a view of a modified form of my invention.

1 represents the ordinary stuffing-box of an engine, and 2 a cylindrical casing of larger diameter than box 1 and made with a ground joint or bearing against the outer end of said box and provided on its inner end with a circular flange 3 to fit into the stuffing-box, as shown. The casing 2 is made on its outer end with a peripheral flange 4, having holes therein for the reception of stud-bolts 5 to secure the casing to the stuffing-box.

A metal ring 6, of slightly less diameter than the interior of casing 2, is made with a ground joint or bearing against the inner end of said casing and provided with a concave groove in its outer face to form a bearing for a convex or circular flange 7 at the outer end of a conical or tapering hard-metal sleeve 8, projecting into the stuffing-box 1, and a Babbitt-metal tapering or conical sleeve 9 is mounted in the sleeve 8 and on the piston-rod 10. A water-groove 9ª is turned in the inner face of sleeve 9, and both of said sleeves 8 and 9 are split longitudinally at their inner ends throughout the greater portion of their length to spring tightly against the rod 10, the slits in the respective sleeves being disposed out of alinement with each other, so as to prevent the escape of steam through them. The outer end of the sleeve 9 projects beyond sleeve 8 and is made spherical or rounded to fit into a concave seat in a ring 11 of slightly less diameter than the casing 2, and said ring held against the sleeve 9 by means of a ring or nut 12, mounted on the piston-rod 10 and made with holes 13 for the reception of a spanner-wrench to screw it into the outer end of casing 2, and thus hold all of the packing in place.

It will be seen that the packing forms, in effect, a ball-and-socket joint at the outer end of the sleeve 8 and at the outer end of sleeve 9, and as the rings 6 and 11 are of slightly less diameter than the casing 2 they can be moved laterally. Thus a slight vibration or incline of the piston-rod will be compensated for by the movement of the packing and no injury thereto result. It will also be seen that with this form of my improvement the use of springs is dispensed with; but springs can be employed, if desired, as will appear from the below description of a modified form of my invention shown in Fig. 3. In this form of my invention a ring or nut 14 is screwed into the outer end of casing 2 and is provided with pins 15, adapted to abut against the outer face of the casing to limit the inward movement of the nut, and hence insure its proper position. These pins can be filed down to compensate for wear of the packing, hence permitting the ring or nut to assume its proper position relative to the packing. The ring or nut is made with a series of screw-threaded holes for the reception of screws 16 and 17, the former having coiled springs 18, disposed between them and the enlarged outer end 19 of sleeve 8 and the latter having springs 20, disposed between them and ring 21, corresponding with ring 11 of the preferred form of my invention, and it will be seen that these springs 18 and 20 serve to hold the bearings tightly together, and their tension can be regulated by the screws 16 and 17, respectively, as will be readily understood.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a piston-rod packing, an elongated tapering soft-metal sleeve having slits extending from its smaller end and terminating at points removed some distance from the larger end of said tube and forming a series of tongues to press against the piston-rod, and means for preventing displacement of said sleeve.

2. A piston-rod packing comprising a soft-metal tapering sleeve and a hard-metal tapering sleeve surrounding the same and both of said sleeves slit longitudinally from one end and only partly throughout their length and having the slits in the respective sleeves disposed out of alinement with each other, the split portions of each sleeve forming a series of tongues, the tongues of the outer sleeve acting to press the tongues of the inner sleeve against the piston-rod, and means for preventing displacement of the inner sleeve.

3. In a piston-rod packing, the combination with a casing and a rod, of a soft-metal sleeve on the rod, a hard-metal sleeve in the casing and mounted on the soft-metal sleeve and universal bearings between the outer end of both of said sleeves and the casing.

4. In a piston-rod packing, the combination with a casing and a rod, of a ring in said casing having a concave outer face, a tapering hard-metal sleeve having a circular or convex flange thereon in the concave outer face of the ring, a soft-metal tapering sleeve between the first-mentioned sleeve and the rod and having a spherical outer end, and a ring in said casing having a concave seat to receive the spherical end of the soft-metal sleeve.

5. In a piston-rod packing, the combination with a stuffing-box, a casing secured thereto and a piston-rod passing through said stuffing-box and casing, of a ring disposed against the inner end of the casing and having a concave seat or groove therein, a tapering or conical hard-metal sleeve projecting into the stuffing-box, a convex or circular flange on the outer end of said sleeve seated in the concave groove in the ring, a soft-metal tapering sleeve disposed between the hard-metal sleeve and the piston-rod and projecting beyond the hard-metal sleeve at its outer end and made spherical or rounded, a ring having a concave groove therein to seat against the outer end of the soft-metal sleeve and a ring or nut screwed into the outer end of the casing to secure all of said parts in place.

In testimony whereof I have signed this specification in the presence of two subscribing witnesses.

FREDERICK D. PHILP.

Witnesses:
JOHN W. BRADLEY,
FRANCIS LEVEY, Jr.